(12) United States Patent
Ohtsuka et al.

(10) Patent No.: US 7,360,445 B2
(45) Date of Patent: Apr. 22, 2008

(54) FLOW SENSOR

(75) Inventors: Kazuhiko Ohtsuka, Tokyo (JP);
Masahiro Kawai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/705,754

(22) Filed: Feb. 14, 2007

(65) Prior Publication Data
US 2008/0077334 A1     Mar. 27, 2008

(30) Foreign Application Priority Data
Sep. 21, 2006    (JP) .............................. 2006-255956

(51) Int. Cl.
*G01F 15/02*    (2006.01)
(52) U.S. Cl. .................................... 73/861.02
(58) Field of Classification Search ............. 73/861.02, 73/204.17, 204.15, 204.11, 204.13, 204.23; 702/100, 24
See application file for complete search history.

(56) References Cited
U.S. PATENT DOCUMENTS
6,357,293 B1 *  3/2002  Ando et al. ............... 73/204.17

6,810,345 B2 *  10/2004  Matsumura et al. ........ 702/100
6,968,283 B2 *  11/2005  Matsumura et al. ........ 702/100

FOREIGN PATENT DOCUMENTS
JP    9-203651 A    8/1997
JP    2001-153701 A    6/2001

* cited by examiner

*Primary Examiner*—Jewel Thompson
(74) *Attorney, Agent, or Firm*—Sughrue Mion, PLLC (57) ABSTRACT

A flow sensor need not have any special terminal for voltage value supply, and can obtain a ratiometric output function at low cost and small size. A calculation circuit calculates, as a reference voltage Vr, a voltage value Vref of an A/D conversion reference power supply in a fuel injection control unit from a terminal voltage of a temperature sensor, and supplies the reference voltage Vr thus calculated by the calculation circuit to a ratiometric output circuit. As a result, a ratiometric output function can be achieved while making it unnecessary a special terminal used only for the purpose of supplying the voltage value Vref.

8 Claims, 5 Drawing Sheets

FLOW SENSOR

BACKGROUND OF THE INVENTION

1. Field of the Invention

The present invention relates to a flow sensor that is arranged, for example, on an intake pipe of an internal combustion engine so as to be used as an air flow sensor (AFS), for detecting the flow rate of fluid by electrically detecting the amount of heat transmitted to the fluid from a heating element arranged therein. In particular, the invention relates to a flow sensor provided with a so-called ratiometric output circuit that outputs a voltage (or current) proportional to a voltage value of an A/D conversion reference power supply of a fuel injection control unit in an internal combustion engine. More specifically, the invention relates to a novel technical improvement of a calculation circuit in such a flow sensor that calculates the voltage value (reference voltage) of the A/D conversion reference power supply of the fuel injection control unit from a voltage supplied to a sensor element (e.g., a temperature sensor) formed integral with the flow sensor.

2. Description of the Related Art

Although in conventional flow sensors, there are a variety of output forms of flow rate detection signals such as voltage, current, frequency, etc., a flow rate detection signal is used, for example, for the fuel injection control of an internal combustion engine.

A fuel injection control unit connected to a flow sensor performs fuel injection control in accordance with the output value of a flow rate detection signal from the flow sensor, but in case where the output form of the flow sensor is a voltage or current, in order to reduce errors occurring upon A/D conversion in the fuel injection control unit, very high accuracy is required of the voltage value of an A/D conversion reference power supply in the fuel injection control unit.

Accordingly, the flow sensor has a so-called ratiometric output function, and is constructed so as to output a voltage proportional to the voltage value of the A/D conversion reference power supply supplied from the fuel injection control unit (see, for example, a first patent document: Japanese patent application laid-open No. H9-203651).

In this case, the flow sensor is provided with a special or dedicated terminal which serves to supply the voltage of the A/D conversion reference power supply from the fuel injection control unit, so that a ratiometric output is formed from the A/D conversion reference power supply.

In addition, in a recent fuel injection control system, to rationalize the assembling work of a sensor element (e.g., a temperature sensor) in a flow sensor, there has also been proposed a technique in which a temperature sensor is formed integral with the flow sensor (see, for example, a second patent document: Japanese patent application laid-open No. 2001-153701). In this case, a voltage from an A/D conversion reference power supply of a fuel injection control unit is supplied to the temperature sensor (e.g., thermistor) through a resistor and a connector terminal.

In conventional flow sensors, there is the following problem. That is, if a ratiometric output function is provided as in the first patent document, a special or dedicated terminal to supply the voltage of an A/D conversion reference power supply from a fuel injection control unit is needed, and hence it is impossible to achieve cost and size reduction.

SUMMARY OF THE INVENTION

Accordingly, the present invention is intended to obviate the problem as referred to above, and has for its object to provide a flow sensor which is capable of obtaining a ratiometric output function at low cost and small size with a simple circuit and control in comparison with the conventional construction.

Bearing the above object in mind, according to the present invention, there is provided a flow sensor which is connected to a fuel injection control unit having an A/D conversion reference power supply therein. The flow sensor includes: a sensor element which is formed integral with the flow sensor and to which electric power is supplied from the A/D conversion reference power supply in the fuel injection control unit; a calculation circuit that calculates a voltage value of the A/D conversion reference power supply as a reference voltage; and a ratiometric output circuit that outputs a voltage or current proportional to the voltage value of the A/D conversion reference power supply based on the reference voltage calculated by the calculation circuit. The calculation circuit calculates the reference voltage based on a voltage supplied to the sensor element.

According to the present invention, by calculating the reference voltage (the voltage value of the A/D conversion reference power supply in the fuel injection control unit) based on another electric signal (e.g., a voltage of an output terminal of a temperature sensor connected to the A/D conversion reference power supply in the fuel injection control unit) connected to the flow sensor, a special or dedicated terminal used only for the purpose of supplying the voltage value of the A/D conversion reference power supply is made unnecessary, so the number of terminals of the flow sensor can be reduced by one as compared with the conventional construction. Accordingly, a ratiometric output function can be achieved at low cost and small size.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings.

Embodiment 1

Figure 1:
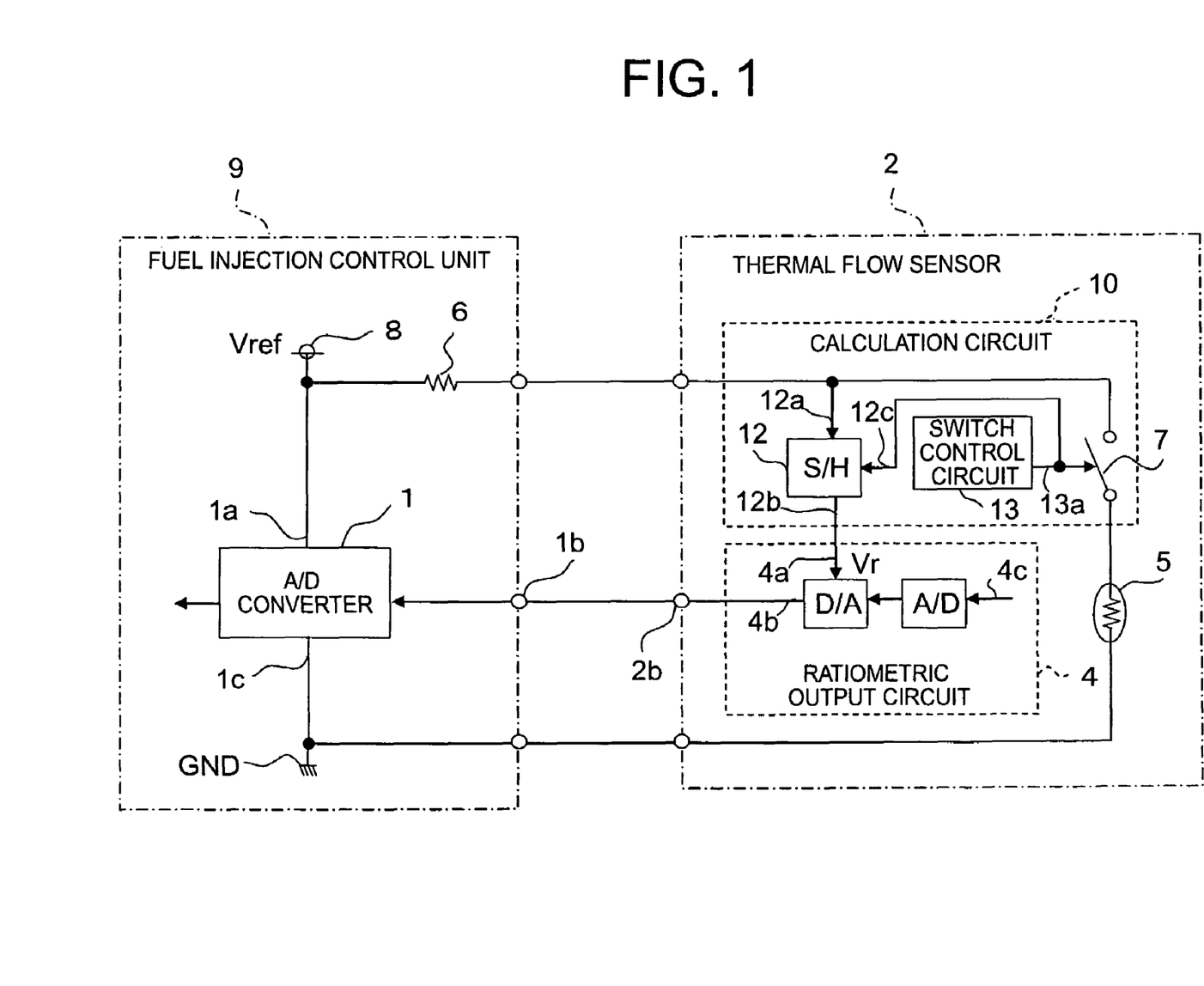
FIG. 1 is a block diagram showing the circuit configuration of a flow sensor according to a first embodiment of the present invention.

Referring to the drawings and first to FIG. 1, there is shown, in a block diagram, the configuration of a flow sensor according to a first embodiment of the present invention.

In FIG. 1, as a typical example of a flow sensor, there is shown a case of a thermal flow sensor 2 having a temperature sensor 5, the construction thereof being such that the thermal flow sensor 2 is connected to a fuel injection control unit 9.

In FIG. 1, the fuel injection control unit 9 includes: an A/D converter 1 having an input terminal 1b, a power supply terminal 1a, and a GND (ground) terminal 1c; a resistor 6 connected to the input terminal 1b and the power supply terminal 1a of the A/D converter 1; an A/D conversion reference power supply 8 connected to the power supply terminal 1a of the A/D converter 1; and a ground GND connected to the GND terminal 1c of the A/D converter 1.

The thermal flow sensor 2 connected to the fuel injection control unit 9 includes: an output terminal 2b connected to the input terminal 1b of the A/D converter 1; a ratiometric output circuit 4; a temperature sensor (e.g., a thermistor) 5 formed integral with the thermal flow sensor 2; and a calculation circuit 10 connected to the ratiometric output circuit 4.

In the fuel injection control unit 9, the A/D converter 1 takes in a voltage (or current) output from the ratiometric output circuit 4 from the input terminal 1b and converts it from analog into digital form.

Hereinafter, the fuel injection control unit 9 performs fuel injection control on an internal combustion engine (not shown) by using the voltage value (or the current value) A/D converted by the A/D converter 1.

A voltage value Vref of the A/D conversion reference power supply 8 is impressed to the power supply terminal 1a of the A/D converter 1, and the GND terminal 1c of the A/D converter 1 is grounded to the ground GND.

The resistor 6 ha its one end connected to the A/D conversion reference power supply 8 and the power supply terminal 1a of the A/D converter 1, and its other end connected to an input terminal 12a of a sample hold circuit 12 arranged in the thermal flow sensor 2 and to one end of a switch 7.

In the thermal flow sensor 2, the temperature sensor 5 has its one terminal connected to the other end of the switch 7, and its other end connected to the ground GND. That is, the temperature sensor 5 is inserted between the switch 7 connected to the A/D conversion reference power supply 8 through the resistor 6 and the ground GND, so that electric power is supplied from the A/D conversion reference power supply 8 when the switch 7 is closed (ON).

The calculation circuit 10 calculates a reference voltage Vr corresponding to the voltage value Vref of the A/D conversion reference power supply 8 based on the voltage value supplied from the A/D conversion reference power supply 8 to the temperature sensor 5 at the open (OFF) time of the switch 7, as will be described later, and inputs it to the ratiometric output circuit 4.

The ratiometric output circuit 4 is composed of an A/D converter and a D/A converter, and has a reference voltage input terminal 4a, an output terminal 4b, and an input terminal 4c. The reference voltage input terminal 4a takes in the reference voltage Vr calculated by the calculation circuit 10. The output terminal 4b outputs the electric signal (corresponding to the detected value of the thermal flow sensor 2) which is taken in from the input terminal 4c and converted into a voltage (or current) proportional to the voltage value Vref of the A/D conversion reference power supply 8.

The calculation circuit 10 is provided with the switch 7 inserted between the temperature sensor 5 and the resistor 6, the sample hold circuit 12 connected to the resistor 6, and a switch control circuit 13 for controlling the switch 7 and the sample hold circuit 12, and calculates the reference voltage Vr (corresponding to the voltage value Vref of the A/D conversion reference power supply 8) based on a voltage supplied to the temperature sensor 5.

The switch 7 connected in series to the temperature sensor 5 is connected to a switch control terminal 13a of the switch control circuit 13, so that it is controlled to open and close by a drive signal output from the switch control terminal 13a.

A drive signal from the switch control terminal 13a is generated based on a clock signal or the like and is impressed to an input terminal 12c of the sample hold circuit 12. The sample hold circuit 12 holds the voltage value input to the input terminal 12a in response to the drive signal from the switch control terminal 13a, and inputs it from an output terminal 12b to the reference voltage input terminal 4a of the ratiometric output circuit 4 as the reference voltage Vr.

The ratiometric output circuit 4 converts, based on the reference voltage Vr input from the reference voltage input terminal 4a, the detected value of the thermal flow sensor 2 input from the input terminal 4c into a voltage (or current) proportional to the reference voltage Vr, and outputs it from the output terminal 4b.

At this time, the temperature sensor 5 is opened at the open time of the switch 7 (an off state shown in FIG. 1), so the voltage value impressed from the A/D conversion reference power supply 8 to the input terminal 12a of the sample hold circuit 12 becomes equal to the voltage value Vref of the A/D conversion reference power supply 8 irrespective of whether the temperature sensor 5 has any resistance value. Accordingly, the sample hold circuit 12 holds the voltage value of the input terminal 12a at the open time of the switch 7 in response to the drive signal from the switch control terminal 13a, and outputs the hold voltage value from the output terminal 12b as the reference voltage Vr. By controlling the sample hold circuit 12 in this manner, the reference voltage Vr equal to the voltage value Vref of the A/D conversion reference power supply 8 is supplied to the ratiometric output circuit 4.

As described above, according to the first embodiment of the present invention, in the thermal flow sensor 2 having the ratiometric output circuit 4 and the temperature sensor 5, the calculation circuit 10 arranged at the output terminal side of the temperature sensor 5 can calculate the reference voltage Vr necessary for the output function of the ratiometric output circuit 4 and input it to the ratiometric output circuit 4. As a result, a special or dedicated terminal used only for the purpose of supplying the voltage value Vref of the A/D conversion reference power supply 8 to the ratiometric output circuit 4 is made unnecessary.

Accordingly, the number of terminals required of the thermal flow sensor 2 can be reduced by one, so a ratiometric output function can be provided to the thermal flow sensor 2 at low cost and small size.

In addition, the circuit configuration is constructed in such a manner that a voltage value is directly supplied to the calculation circuit 10 from the A/D conversion reference power supply 8 through the resistor 6, thereby making it possible to provide the ratiometric output function with a high degree of precision.

Although in FIG. 1, the ratiometric output circuit 4 is shown as composed of an A/D converter-D/A converter arrangement, another ratiometric output circuit of a different construction may also instead be used.

In addition, the sample hold circuit 12 is arranged at a side of the ratiometric output circuit 4 near the reference voltage input terminal 4a, but may instead be arranged at a side of the ratiometric output circuit 4 near the output terminal 4b, or may be build into the D/A converter in the ratiometric output circuit 4.

The above is also applied to a second through a fourth embodiment to be described later.

Embodiment 2

Figure 2:
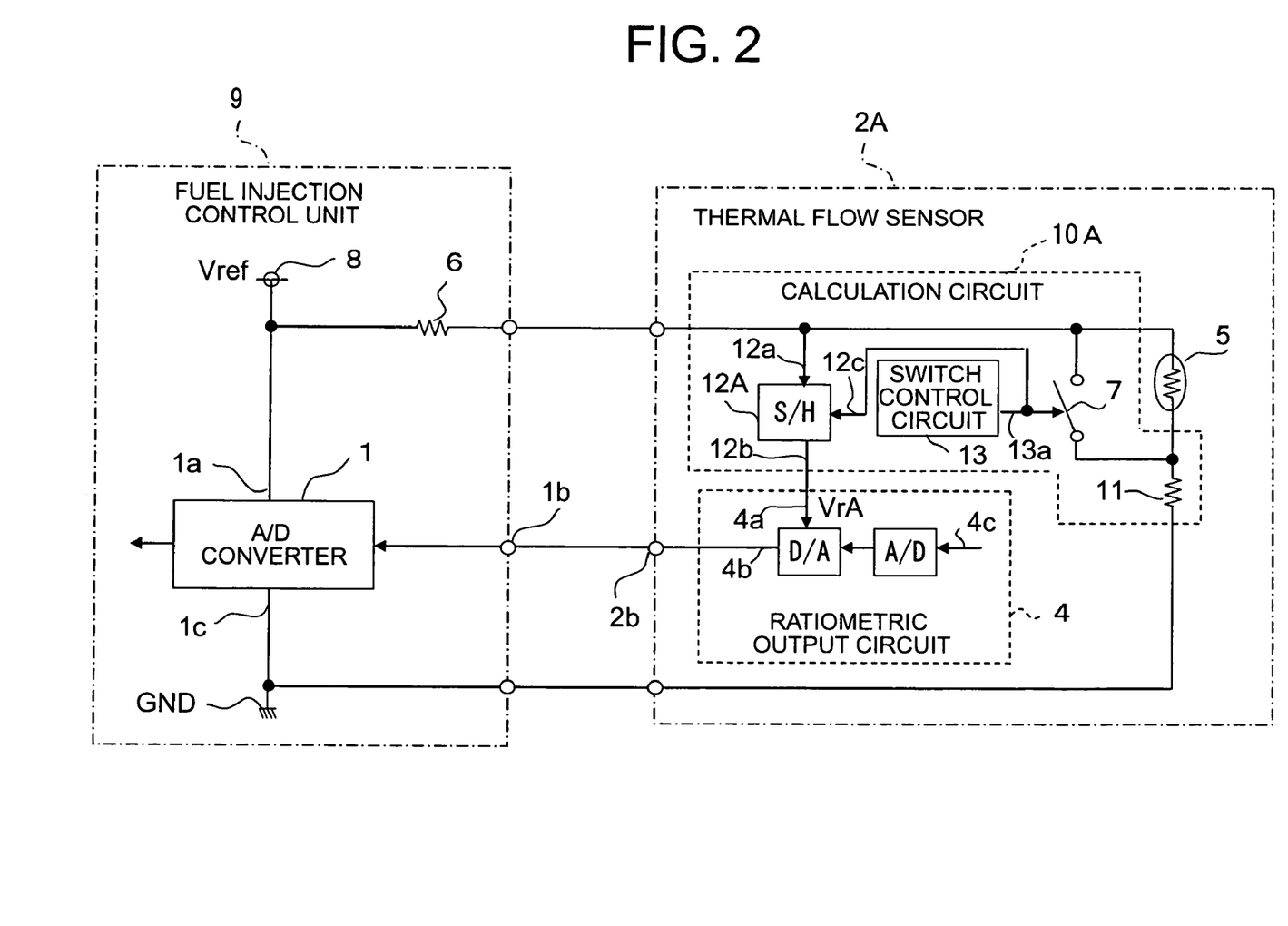
FIG. 2 is a block diagram showing the circuit configuration of a flow sensor according to a second embodiment of the present invention.

Although in the calculation circuit 10 (see FIG. 1) according to the above-mentioned first embodiment, the voltage value detected at the open time of the switch 7 connected in series to the temperature sensor 5 is calculated as the reference voltage Vr, a voltage value detected at the closed time (at the NO time) of the switch 7 connected in parallel to the temperature sensor 5 may be calculated as a reference voltage VrA, as in a calculation circuit 10A shown in FIG. 2.

Hereinafter, a second embodiment of the present invention will be described while referring to FIG. 2.

In FIG. 2, the same parts or components as those described above (see FIG. 1) are identified by the same symbols or by the same symbols with "A" affixed to their ends, while omitting a detailed explanation thereof.

In this case, the calculation circuit 10A is provided with a resistor 11 connected in series to the temperature sensor 5, and the resistor 11 is inserted between the temperature sensor 5 and the ground GND.

In the calculation circuit 10A, the switch 7 is connected in parallel to the temperature sensor 5, and has its one end connected to the resistor 6 and a sample hold circuit 12A, and its other end connected to a junction between the temperature sensor 5 and the resistor 11.

In addition, the sample hold circuit 12A holds a voltage value impressed from the A/D conversion reference power supply 8 to the input terminal 12a at the closed time of the switch 7 as the reference voltage VrA, and inputs it to the reference voltage input terminal 4a of the ratiometric output circuit 4.

The output terminal 4b of the ratiometric output circuit 4 is connected to the input terminal 1b of the A/D converter 1 of the fuel injection control unit 9 through an output terminal 2b of a thermal flow sensor 2A. A drive signal output from the switch control terminal 13a of the switch control circuit 13 is input not only to the switch 7 but also to the input terminal 12c of the sample hold circuit 12A. The sample hold circuit 12 holds the voltage value input to the input terminal 12a in response to the drive signal from the switch control terminal 13a, and inputs it from the output terminal 12b to the reference voltage input terminal 4a of the ratiometric output circuit 4 as the reference voltage VrA.

Hereinafter, the ratiometric output circuit 4 converts, based on the reference voltage VrA, the detected value of the thermal flow sensor 2A taken in from its input terminal 4c into a voltage (or current) proportional to the reference voltage VrA, and outputs it from its output terminal 4b.

At this time, the temperature sensor 5 is short-circuited at the closed time of the switch 7, so the voltage value impressed to the input terminal 12a of the sample hold circuit 12A becomes equal to a voltage value which is obtained by dividing the voltage value Vref of the A/D conversion reference power supply 8 by the resistor 6 and the resistor 11 irrespective of whether the temperature sensor 5 has any resistance value. Accordingly, the sample hold circuit 12A holds the voltage value input to the input terminal 12a at the closed time of the switch 7, and outputs it from the output terminal 12b to the reference voltage input terminal 4a of the ratiometric output circuit 4 as the reference voltage VrA. As a result, the calculation circuit 10A can supply a voltage value proportional to the voltage value Vref of the A/D conversion reference power supply 8 to the ratiometric output circuit 4 as the reference voltage VrA.

As described above, according to the second embodiment of the present invention, the divided voltage value of the voltage value Vref at the closed time of the switch 7 can be calculated as the reference voltage VrA by the calculation circuit 10A, so a special or dedicated terminal used only for the purpose of supplying the voltage value Vref to the thermal flow sensor 2A is not required, thereby making it possible to reduce the number of terminals by one. Accordingly, a ratiometric output function can be provided to the thermal flow sensor 2A at low cost and small size, similarly as stated above.

Embodiment 3

Figure 3:
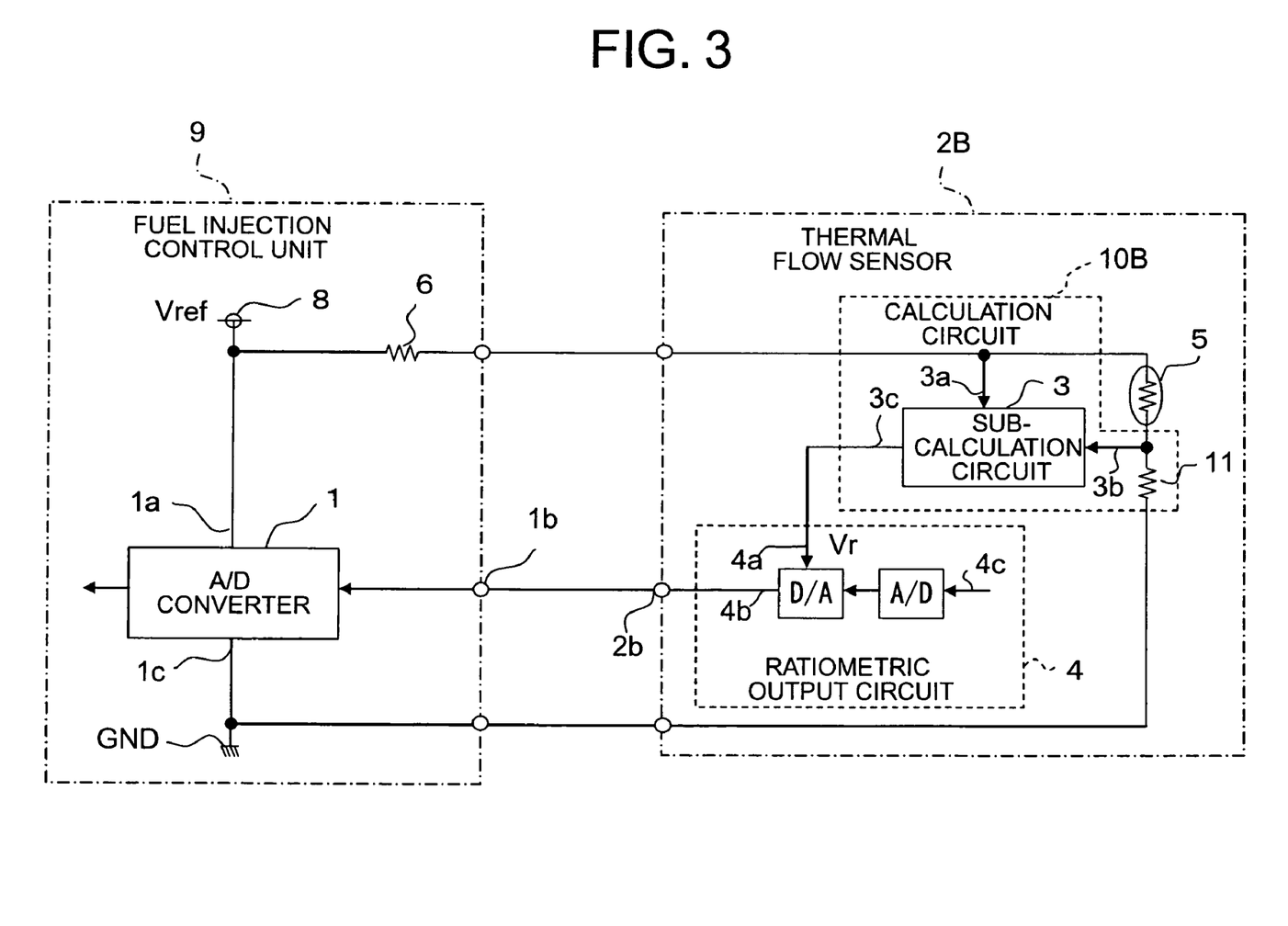
FIG. 3 is a block diagram showing the circuit configuration of a flow sensor according to a third embodiment of the present invention.

In the calculation circuit 10A (see FIG. 2) according to the above-mentioned second embodiment, the resistor 11 connected in series to the temperature sensor 5, the switch 7 connected in parallel to the temperature sensor 5, the sample hold circuit 12A and the switch control circuit 13 are used, but the reference voltage Vr may be calculated by using the resistor 11 connected in series to the temperature sensor 5 and a subcalculation circuit 3 connected in parallel to the temperature sensor 5, as in a calculation circuit 10B shown in FIG. 3.

Hereinafter, a third embodiment of the present invention will be described in detail while referring to FIG. 3. In FIG. 3, the same parts or components as those described above (see FIG. 1 and FIG. 2) are identified by the same symbols or by the same symbols with "B" affixed to their ends, while omitting a detailed explanation thereof.

In this case, the subcalculation circuit 3 connected in parallel to the temperature sensor 5 takes in individual voltages V3a, V3b at the opposite ends of the temperature sensor 5 from individual input terminals 3a, 3b, and calculates the reference voltage Vr based on the individual voltages V3a, V3b and the individual resistance values R6, R11 of the resistors 6, 11, as shown in the following expression (1).

$$Vr = \frac{V3b}{R11} \times R6 + V3a \qquad (1)$$

In expression (1) above, the reference voltage Vr is equal to the voltage value Vref of the A/D conversion reference power supply 8, as previously stated. The reference voltage Vr calculated as shown by the above expression (1) is input from the output terminal 3c to the reference voltage input terminal 4a of the ratiometric output circuit 4.

Hereinafter, similarly as stated above, the ratiometric output circuit 4 converts the detected value of the thermal flow sensor 2A taken in from the input terminal 4c into a voltage (or current) proportional to the reference voltage Vr, and outputs it from the output terminal 4b. Thus, the ratiometric function can be held by supplying the reference voltage Vr calculated by the above expression (1) to the ratiometric output circuit 4.

As described above, according to the third embodiment of the present invention, the reference voltage Vr equal to the voltage value Vref of the A/D conversion reference power supply 8 in the fuel injection control unit 9 is calculated by the calculation circuit 10B and is supplied to the ratiometric output circuit 4, so there is no need to provide a special or dedicated terminal to supply the voltage value Vref to the thermal flow sensor 2B, as stated above.

Accordingly, the number of terminals required of the thermal flow sensor 2B can be reduced by one, whereby the ratiometric output function can be provided to the thermal flow sensor 2B at low cost and small size.

In addition, by using the subcalculation circuit 3, the switch 7, the sample hold circuits 12, 12A and the switch control circuit 13 as referred to above (see FIGS. 1 and 2) are made unnecessary, and besides, the opening and closing action of the switch and a clock signal for generation of a drive signal are also not required, so the thermal flow sensor 2B can further be made lower in cost and smaller in size.

Embodiment 4

Although in the above-mentioned third embodiment (FIG. 3), the individual voltages. V3a, V3b at the opposite ends of the temperature sensor 5 are input to the subcalculation circuit 3, the relation of connecting positions between the temperature sensor 5 and the resistor 11 may be constructed in a reversed manner, as shown in FIG. 4.

Figure 4:
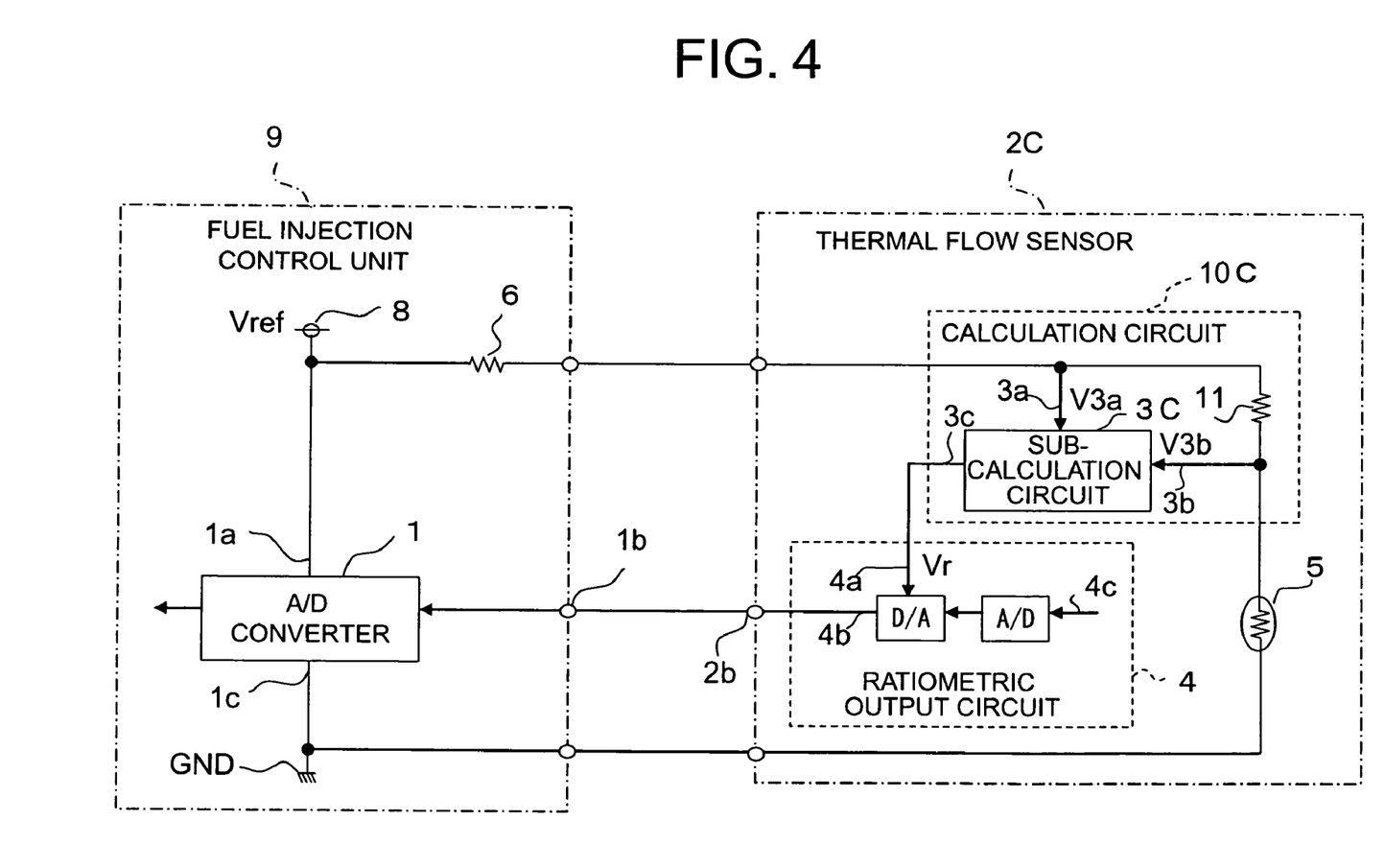
FIG. 4 is a block diagram showing the circuit configuration of a flow sensor according to a fourth embodiment of the present invention.

FIG. 4 is a block diagram showing the circuit configuration of a flow sensor according to a fourth embodiment of the present invention, wherein the same parts or components as those described above (see FIG. 1 through FIG. 3) are identified by the same symbols or by the same symbols with "C" affixed to their ends, while omitting a detailed explanation thereof.

In FIG. 4, a calculation circuit 10C in a thermal flow sensor 2C is connected in parallel to a resistor 11, and a temperature sensor 5 is inserted between the resistor 11 and a ground GND.

In this case, the calculation circuit 10C calculates a reference voltage Vr based on individual voltages V3a, V3b (individual voltages at the opposite ends of the resistor 11) impressed on input terminals 3a, 3b and individual resistance values R6, R11 of resistors 6, 11, as shown in the following expression (2).

$$Vr = \frac{V3a - V3b}{R11} \times R6 + V3a \quad (2)$$

The reference voltage Vr calculated from the above expression (2) is equal to a voltage value Vref of an A/D conversion reference power supply 8, as previously stated. Hereinafter, the reference voltage Vr thus calculated is supplied to a reference voltage input terminal 4a of a ratiometric output circuit 4.

Accordingly, there is achieved an operational effect that the thermal flow sensor 2C can be produced at low cost and small size, as stated above.

Embodiment 5

Figure 5:
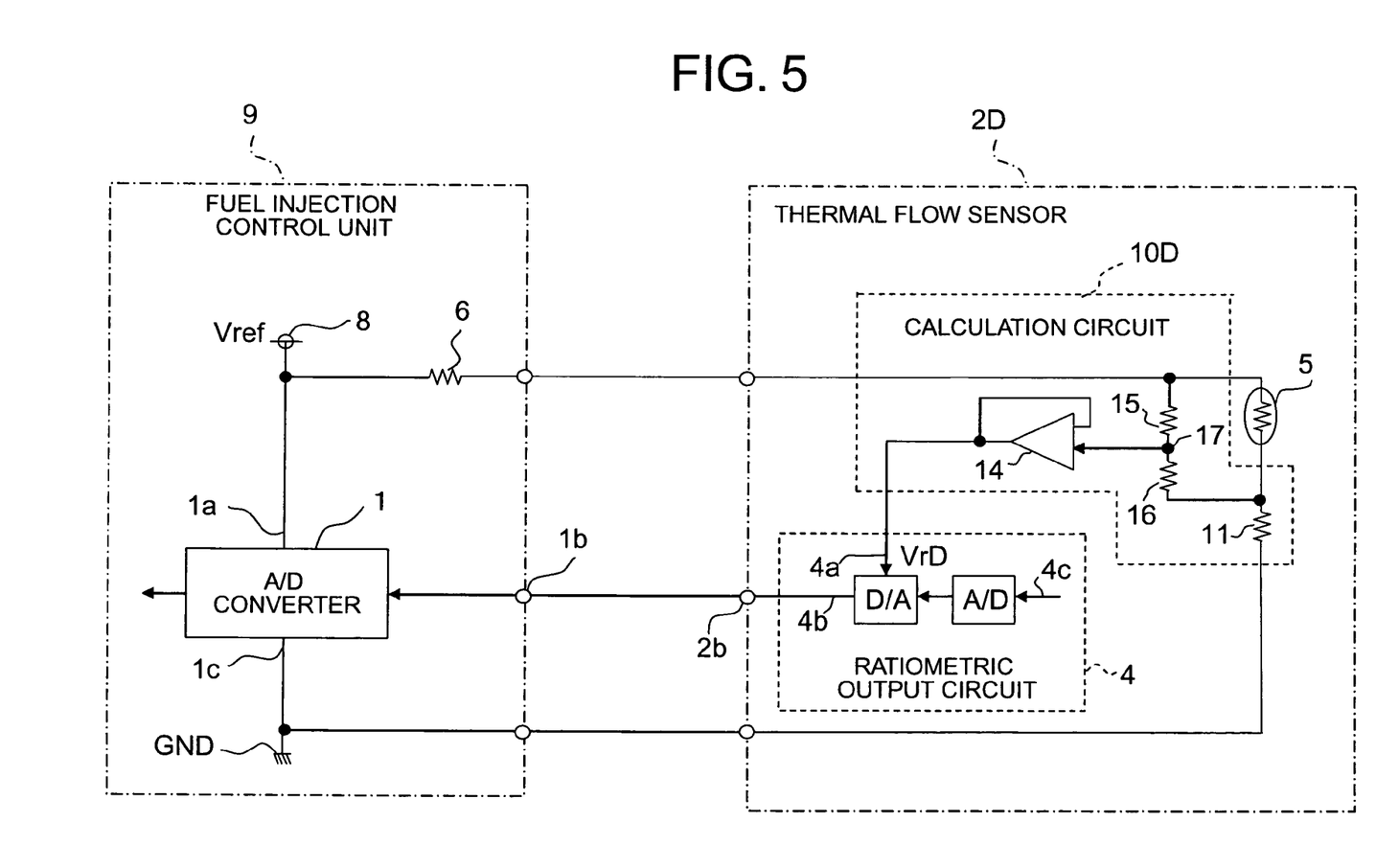
FIG. 5 is a block diagram showing the circuit configuration of a flow sensor according to a fifth embodiment of the present invention.

In the calculation circuit 10B (see FIG. 3) according to the above-mentioned third embodiment, the subcalculation circuit 3 connected in parallel to the temperature sensor 5 is used, but as in a calculation circuit 10D shown in FIG. 5, there may instead be used a voltage dividing section (resistors 15, 16) that is connected in parallel to a temperature sensor 5, and a buffer 14 that calculates a reference voltage VrD based on a divided voltage obtained by the voltage dividing section.

Hereinafter, a fifth embodiment of the present invention will be described while referring to FIG. 5. In FIG. 5, the same parts or components as those described above (see FIG. 1 through FIG. 3) are identified by the same symbols or by the same symbols with "D" affixed to their ends, while omitting a detailed explanation thereof.

In this case, in the calculation circuit 10D, the resistors 15, 16, which constitute the voltage dividing section, are connected in parallel to the temperature sensor 5. The resistor 15 has its one end connected to a resistor 6, and its other end connected to a junction between the temperature sensor 5 and a resistor 11 through the resistor 16. A divided voltage of a voltage across the opposite ends of the temperature sensor 5 is generated from the junction 17 of the resistors 15, 16 and is input to the buffer 14. The buffer 14 calculates the reference voltage VrD based on the divided voltage from the junction 17, and inputs it to a reference voltage input terminal 4a of a ratiometric output circuit 4.

Here, it is assumed that a voltage division ratio of the divided voltage section with respect to the voltage across the opposite ends of the temperature sensor 5 is set to "1:1" for example, and an amplification factor of the buffer 14 is set to "1". In this case, the reference voltage VrD output from the buffer 14 becomes a half of the voltage value Vref of the A/D conversion reference power supply 8.

The ratiometric output circuit 4 converts the detected value of a thermal flow sensor 2D taken in from its input terminal 4c into a voltage (or current) proportional to the reference voltage VrD, and outputs it from its output terminal 4b.

Here, the individual resistance values R6, R11, R15, R16 of the resistor 6, 11, 15, 16 are set to satisfy the above-mentioned voltage division ratio "1:1" according to the voltage dividing section, as shown by the following expressions (3), (4).

$$R6 = R11 \quad (3)$$

$$R15 = R16 \quad (4)$$

As a result, irrespective of whether the temperature sensor 5 takes any resistance value, the reference voltage VrD output from the buffer 14 becomes a voltage value that is obtained by dividing the voltage value Vref of the A/D conversion reference power supply 8 into ½. Accordingly, the reference voltage VrD equal to half of the voltage value Vref of the A/D conversion reference power supply 8 is always supplied to the reference voltage input terminal 4a of the ratiometric output circuit 4.

As described above, according to the fifth embodiment of the present invention, the provision of the calculation circuit 10D for calculating the reference voltage VrD based on the divided voltage of the voltage across the opposite ends of the temperature sensor 5 makes it unnecessary to use a special or dedicated terminal to supply the voltage value Vref of the A/D conversion reference power supply 8 to the thermal flow sensor 2D, as stated above, so the number of terminals required of the thermal flow sensor 2D can be reduced by one, whereby the ratiometric output function can be provided to the thermal flow sensor 2D at low cost and small size.

In addition, similar to the above-mentioned third embodiment, the switch 7, the switch control circuit 13 and the sample hold circuits 12, 12A are not required, and hence clock signals or the like used for the opening and closing action of the switch 7 and the drive signal are not required, either, so the ratiometric output function can be provided at further low cost and small size.

Although in the above-mentioned fifth embodiment, the amplification factor of the buffer 14 is set to "1", it may be set to an arbitrary amplification factor as required. For example, the reference voltage VrD, which is obtained by amplifying the voltage value Vref, divided into a value less than "1", by an amplification factor of "1" or more may be supplied to the reference voltage input terminal 1b of the ratiometric output circuit 4.

In addition, although in the above-mentioned first through fourth embodiments, reference has been made, by way of example, to the thermal flow sensors that use the temperature sensor 5 as a sensor element, it is needless to say that the present invention can be applied to any arbitrary flow sensors that use other sensor elements while achieving similar operational effects.

While the invention has been described in terms of preferred embodiments, those skilled in the art will recognize that the invention can be practiced with modifications within the spirit and scope of the appended claims.

What is claimed is:

1. A flow sensor which is connected to a fuel injection control unit having an A/D conversion reference power supply therein, said flow sensor comprising:
 a sensor element which is formed integral with said flow sensor and to which electric power is supplied from said A/D conversion reference power supply in said fuel injection control unit;
 a calculation circuit that calculates a voltage value of said A/D conversion reference power supply as a reference voltage; and
 a ratiometric output circuit that outputs a voltage or current proportional to the voltage value of said A/D conversion reference power supply based on said reference voltage calculated by said calculation circuit;
 wherein said calculation circuit calculates said reference voltage based on a voltage supplied to said sensor element.

2. The flow sensor as set forth in claim 1, wherein said sensor element comprises a temperature sensor.

3. The flow sensor as set forth in claim 2, wherein said calculation circuit includes:
 a switch that is connected in series to said temperature sensor; and
 a switch control circuit that controls the opening and closing of said switch; wherein said calculation circuit calculates said reference voltage based on a voltage value impressed thereto from said A/D conversion reference power supply when said switch is opened.

4. The flow sensor as set forth in claim 2, wherein said calculation circuit includes:
 a resistor that is connected in series to said temperature sensor;
 a switch that is connected in parallel to said temperature sensor; and
 a switch control circuit that controls the opening and closing of said switch;
 wherein said calculation circuit calculates said reference voltage based on a voltage value impressed thereto from said A/D conversion reference power supply when said switch is closed.

5. The flow sensor as set forth in claim 2, wherein said calculation circuit includes:
 a resistor that is connected in series to said temperature sensor; and
 a subcalculation circuit that is connected in parallel to said temperature sensor;
 wherein said calculation circuit calculates said reference voltage based on individual voltages at the opposite ends of said temperature sensor.

6. The flow sensor as set forth in claim 2, wherein said calculation circuit includes:
 a resistor that is connected in series to said temperature sensor; and
 a subcalculation circuit that is connected in parallel to said resistor;
 wherein said calculation circuit calculates said reference voltage based on individual voltages at the opposite ends of said resistor.

7. The flow sensor as set forth in claim 2, wherein said calculation circuit includes:
 a resistor that is connected in series to said temperature sensor; and
 a voltage dividing section that divides a voltage across the opposite ends of said temperature sensor;
 wherein said calculation circuit calculates said reference voltage based on the voltage divided by said voltage dividing section.

8. The flow sensor as set forth in claim 7, wherein a voltage division ratio of the voltage across the opposite ends of said temperature sensor by said voltage dividing section is 1:1.

* * * * *